United States Patent Office 3,595,874
Patented July 27, 1971

---

3,595,874
**3,4,5,10-TETRAHYDROAZEPINO[2,3-b]
INDOL-5a (2H)-OLS**
Jackson B. Hester, Portage, Mich., assignor to The
Upjohn Company, Kalamazoo, Mich.
No Drawing. Filed Feb. 28, 1969, Ser. No. 803,474
Int. Cl. C07d 27/36
U.S. Cl. 260—326.3                                3 Claims

---

ABSTRACT OF THE DISCLOSURE

New 3,4,5,10-tetrahydroazepino[2,3-b]indol-5a(2H)-ols of the formula:

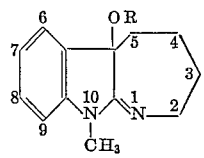

wherein R is selected from the group consisting of hydrogen and acetyl, are prepared. These compounds and their pharmacologically acceptable acid addition salts have sedative action and can be used in mammals and birds as tranquilizers.

---

BACKGROUND OF THE INVENTION

Field of the invention

The present invention is concerned with new organic compounds and more particularly with novel 3,4,5,10-tetrahydroazepino[2,3-b]indol-5a(2H)-ols and their acid addition salts, intermediates and a process of production thereof.

The processes of production for the compounds of the present invention can be illustratively represented as follows:

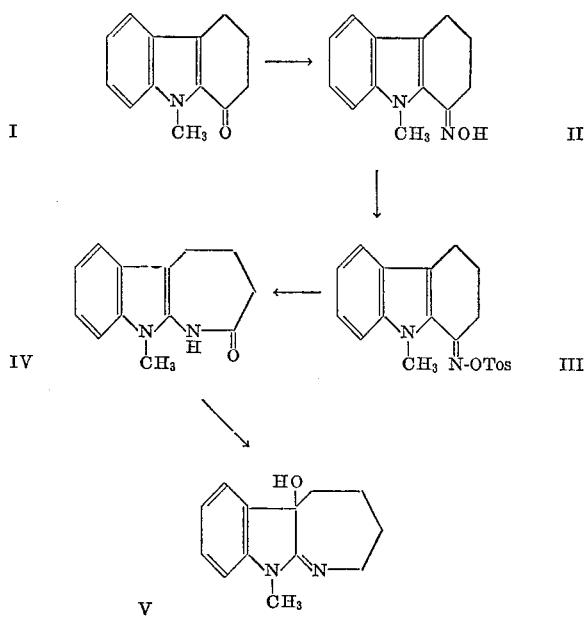

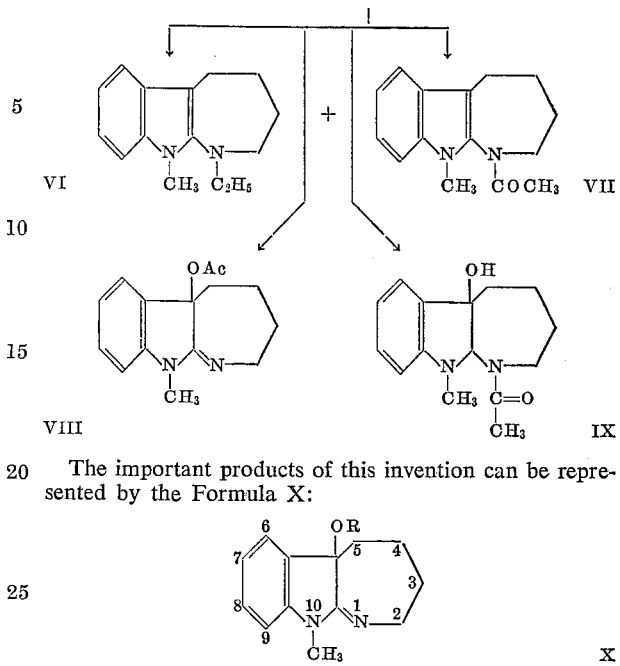

The important products of this invention can be represented by the Formula X:

wherein R is selected from the group consisting of hydrogen and acetyl.

The process of the present invention comprises: treating 3,4-dihydro-9-methylcarbazol-1(2H)-one (I) (produced from 3,4-dihydrocarbazol-1(2H)-one with methyl sulfate) with a hydroxylamine salt in the presence of a base to obtain the corresponding oxime II, which is reacted with p-toluenesulfonyl chloride to produce 3,4-dihydro-9-methylcarbazol-1(2H)-one oxime p-toluenesulfonate III; compound III by absorption on water deactivated neutral alumina is converted to 3,4,5,10-tetrahydro-10 - methylazepino[2,3-b]indol-2(1H) - one (IV); compound IV when reduced with lithium aluminum hydride and after being permitted to stand in air, yielded 3,4,5,10-tetrahydro-10-methylazepino[2,3 - b]indol-5a(2H)-ol V, hydrogenating compound V in the presence of a palladium-on-charcoal catalyst in acetic anhydride gave:

1-ethyl-1,2,3,4,5,10-hexahydro-10-methylazepino[2,3-b]
  indole (VI);
1-acetyl-1,2,3,4,5,10-hexahydro-10-methylazepino
  [2,3-b]indole (VII);
3,4,5,10-tetrahydro-10-methylazepino[2,3-b]indol-5a
  (2H)-ol acetate (VIII);
1-acetyl-2,3,4,5,10,10a-hexahydro-10-methylazepino
  [2,3-b]indol-5a(1H)-ol (IX).

DESCRIPTION OF THE PREFERRED EMBODIMENT

The novel compounds of the Formula X including acid addition salts of the amino compounds have sedative and transquilizing effects in mammals and birds.

The acid addition salts of compounds of Formula X, contemplated in this invention, are the hydrochlorides, hydrobromides, hydroiodides, sulfates, phosphates, acetates, lactates, tartrates, citrates, salicylates, succinates, malates, maleates, pamoates, cyclohexanesulfamates, methanesulfonate and the like, prepared by reacting a compound of Formula X with the stoichiometrically calculated amount of the selected pharmacologically acceptable acid.

Sedative effects of 3,4,5,10 - tetrahydro-10-methylazepino[2,3-b]indol-5a(2H)-ol as hydrochloride are shown by the following tests in mice.

Chimney test [Med. Exp. 4, 11 (1961)]: The effective dosage for 50% of mice ($ED_{50}$) is 28 mg./kg. The test determines the ability of mice to back up and out of a vertical glass cylinder within 30 seconds. At the effective dosage, 50% of the mice failed doing it. Dish test: Mice in Petri dishes (10 cm. diameter, 5 cm. high, partially embedded in wood shavings) climb out in a very short time, when not treated. Mice remaining in the dish for more than 3 minutes indicates tranquilization. $ED_{50}$ equals the dosage of the test compound at which 50% of the mice remain in the dish. $ED_{50}$ (intraperitoneal administration) in this test was 32 mg./kg.

Pedestal test: The untreated mouse leaves the pedestal in less than a minute to climb back to the floor of the standard mouse box. Tranquilized mice will stay more than 1 minute. $ED_{50}$ (intraperitoneal administration) is 36 mg./kg.

Nicotine antagonism test: Mice in groups of 6 were injected with 3,4,5,10-tetrahydro-10-methylazepino[2,3-b] indol-5a(2H)-ol hydrochloride. Thirty minutes later the mice including control (untreated) mice are injected with 2 mg./kg. nicotine salicylate. The control mice show overstimulation, i.e., (1) running convulsion followed by (2) tonic extensor fits; followed by (3) death. A dosage of 8 mg./kg. protected 50% of the mice against (2) and (3) ($ED_{50}$).

The pharmaceutical forms contemplated by this invention include pharmaceutical compositions suited for oral, parenteral and rectal use, e.g., ointment, lotions, tablets, oils, powder packets, cachets, dragees, capsules, solutions, suspensions, sterile injectable forms, suppositories, bougies and the like. Suitable diluents or carriers such as carbohydrates (lactose), proteins, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds food premixes, with starch, oatmeal, dried fishmeat, fishmeal, flour and the like can be prepared.

As tranquilizer the compounds of Formula X can be used in dosages of 2-75 mg./kg. in oral or injectable preparations as described above, to alleviate tension and anxiety in mammals or birds, such as e.g., occurs when animals are in travel.

Other acid addition salts of the amine compounds of Formula X can be made such as the fluosilicic acid addition salts which are useful mothproofing compounds or the trichloroacetates, useful as herbicides against Johnson grass, Bermuda grass, yellow foxtail, green foxtail, and quack grasses.

In carrying out the process of this invention, 3,4-dihydro-9-methylcarbazol-1(2H)-one (I) is refluxed with hydroxylamine hydrochloride and anhydrous sodium acetate, water and ethanol for a period between 12 to 24 hours. After the reaction is termed and the reaction mixture cooled, a crystalline product of 3,4-dihydro-9-methylcarbazol-1(2H)-one oxime (II) precipitates in the mixture and can be recovered by filtration. The thus-obtained oxime (II) is treated with p-toluenesulfonyl chloride in pyridine. The mixture is allowed to stand at room temperature for between 1 to 6 days and poured into ice water; the product, 3,4-dihydro-9-methylcarbazol-1(2)-one oxime p-toluenesulfonate (III), is recovered by filtration and may be purified by conventional procedures such as chromatography and recrystallization.

The thus-obtained toluenesulfonate of Formula III is treated with neutral alumina in the presence of a small amount of water, 0.2 to 0.5%, by weight of the alumina and the product is obtained by extraction of the reaction mixture contained in a column. The product, 3,4,5,10-tetrahydro-10-methylazepino[2,3-b]indol - 2(1H) - one (IV), can be further purified by chromatography or recrystallization.

The thus-obtained 3,4,5,10 - tetrahydro-10-methylazepino[2,3-b]indol-2(1H)-one (IV) by treatment with lithium aluminum hydride and subsequently exposure to air is converted to 3,4,5,10-tetrahydro-10-methylazepino [2,3-b]indol-5a(2H)-ol (V).

Hydrogenating this product (V) in the presence of a 10% palladium-on-carbon catalyst and in a solution or mixture of acetic anhydride produces pure products which are separated by chromatography and are:

1-ethyl-1,2,3,4,5,10-hexahydro-10-methylazepino[2,3-b] indole (VI) as the hydrochloride;
1-acetyl-1,2,3,4,5,10-hexahydro-10-methylazepino[2,3-b] indole (VII);
3,4,5,10-tetrahydro-10-methylazepino[2,3-b]indol-5a (2H)-ol acetate (VIII);
1-acetyl-2,3,4,5,10,10a-hexahydro-10-methylazepino [2,3-b]indol-5a(1H)-ol (IX).

The following examples are illustrative of the process and products of the present invention, but are not to be constructed as limiting.

EXAMPLE 1

*3,4-dihydro-9-methylcarbazol-1(2H)-one oxime*

A mixture of 3,4-dihydro-9-methylcarbazol-1(2H)-one (112.2 g., 0.563 mole), hydroxylamine hydrochloride (59.4 g.), anhydrous sodium aceate (76.6 g.), water (510 ml.) and ethanol (2100 ml.) was refluxed under nitrogen for 18 hours and cooled in an ice bath. The resulting crystalline product was collected byl filtration, washed with water and dried to give 106.3 g. (87.9%) of 3,4-dihydro-9-methylcarbazol-1(2H)-one oxime of melting point 183–185° C.

EXAMPLE 2

*3,4dihydro-9-methylcarbazol-1(2H)-one oxime p-toluenesulfonate*

A solution of 3,4-dihydro-9-methylcarbazol-1(2H)-one oxime (112.2 g., 0.524 mole) and p-toluenesulfonyl chloride (198 g., 1.05 mole) in pyridine (6 l.) was prepared at 0° C., stored under nitrogen at ambient temperature in the dark for 98 hours and poured into ice water (12 l.). This mixture was stirred for about 1 hour and the resulting crystalline product was collected by filtration, washed with water, dried and recrystallized from ethyl acetate-Skellysolve B hexanes to give 161.8 g. (84.1%) of -3,4-dihydro-9-methylcarbazol-1(2H)-one oxime p-toluenesulfonate of melting point 119.5–121.5° C. The analytical sample of melting point 120–121.5° C. was prepared by recrystallizing some of this material from ethyl acetate-Skellysolve B hexanes.

U.V.: $\lambda_{max}$. 207, 226 and 310 m$\mu$ ($\epsilon$ 29,600; and 26,350 and 26,050 respectively) and inflections at 243, 274 and 345 m$\mu$ ($\epsilon$ 16,700; 3450 and 6500 respectively).

*Analysis.*—Calcd. for $C_{20}H_{20}N_2O_3S$ (percent): C, 65.19; H, 5.47; N, 7.60; S, 8.70. Found (percent): C, 65.15; H, 5.39; N, 7.64; S, 8.53.

EXAMPLE 3

*3,4,5,10-tetrahydro-10-methylazepino[2,3-b]-indol-2(1H)-one*

A solution of 3,4-dihydro-9-methylcarbazol-1(2H)-one oxime p-toluenesulfonate (153.7 g., 0.417 mole) in benzene (1.5 l.) was absorbed on a column of neutral alumina (15 kg.) which had been deactivated with 0.4% water. The column was developed with 32 l. of benzene and eluted with 10 l. of chloroform followed by 25 l. of 20% methanol-80% chloroform. The combined product was chromatographed on silica gel (4.5 kg.) with 60% ethyl acetate-40% cyclohexane. The product obtained from this column was dissolved in methanol-ethyl acetate, decolorized with Darco G–60 activated charcoal and crystallized from ethyl acetate to give 20.6 g. (23.1%) of 3,4,5,10 - tetrahydro - 10 - methyl-azepino[2,3-b]indol- 2(1H)-one, of melting point 189–191° C. The analytical sample of melting point 193–194.5° C. was prepared by recrystallizing some of this material from ethyl acetate.

U.V.: $\lambda_{max}$ 232 and 297 m$\mu$ ($\epsilon$ 30,500 and 13,800 respectively) with inflections at 211 and 292 m$\mu$ ($\epsilon$ 29,250 and 12,700 respectively).

*Analysis.*—Calcd. for $C_{13}H_{14}N_2O$ (percent): C, 72.87; H, 6.59; N, 13.08. Found (percent): C, 72,89; H, 6.58; N, 13.22.

EXAMPLE 4

*3,4,5,10-tetrahydro-10-methylazepino[2,3-b]-indol-5a(2H)-ol hydrochloride*

3,4,5,10 - tetrahydro - 10 - methylazepino[2,3-b]indol-2(1H)-one (17.7 g., 0.0824 mole) was added, under nitrogen, to an ice cold, stirred suspension of lithium aluminum hydride (18 g.) in tetrahydrofuran. The resulting mixture was refluxed for 18 hours, cooled in an ice bath and treated successively with water (18 ml.), 15% aqueous sodium hydroxide (18 ml.) and water (54 ml.). This mixture was stirred for 1.5 hours and filtered. The filtrate was concentrated under reduced pressure. An ethyl acetate solution of the residue was allowed to stand at ambient temperature for 3 hours and was then cooled in an ice bath and acidified with methanolic hydrogen chloride giving a precipitate. The precipitate was collected by filtration and dried to give 14.7 g. (70.6%) of 3,4,5,10-tetrahydro-10-methyl-azeapino[2,3-b]indol-5a(2H)-ol hydrochloride of melting point 268–269° C. The analytical sample of melting point 264.5–265° C. was prepared by recrystalling some of this material from methanol-ethyl acetate.

U.V.: $\lambda_{max}$ 219, 271, 278 and 296 m$\mu$ ($\epsilon$ 20,550; 5930; 5810 and 4120 respectively) with an inflection at 222 m$\mu$ ($\epsilon$ 20,000).

*Analysis.*—Calcd. for $C_{13}H_{17}ClN_2O$ (percent): C, 61.77; H, 6.78; Cl, 14.03; N, 11.09. Found (percent): C, 61.69; H, 6.91; Cl, 14.05; N, 11.12; $H_2O$<0.1.

EXAMPLE 5

*Hydrogenation of 3,4,5,10-tetrahydro-10-methylazepino-[2,3-b]indol-5a(2H)-ol in acetic anhydride with palladium*

A solution of 3,4,5,10-tetrahydro-10-methylazepino-[2,3-b]indol-5a(2H)-ol hydrochloride in water was cooled in an ice bath, made alkaline with sodium hydroxide and extracted with ether. The extract was washed with brine, dried over anhydrous potassium carbonate and concentrated in vacuo. The residue was crystallized from ethyl acetate to give 3,4,5,10-tetrahydro-10-methylazepino[2,3-b]indol-5a(2H)-ol of melting point 129–133° C. (If necesary, this material may be purified by chromotography on silica gel with 2% triethylamine, 2.5% methanol, 95.5% ethyl acetate.)

U.V.: $\lambda_{max}$ 217 and 277 m$\mu$ ($\epsilon$ 24,050 and 13,650 respectively) with an inflection at 302 m$\mu$ ($\epsilon$ 2700).

*Analysis.*—Calcd. for $C_{13}H_{16}N_2O$ (percent): C, 72.19; H, 7.46; N, 12.95. Found (percent): C, 71.83; H, 7.78; N, 12.75.

A mixture of 3,4,5,10-tetrahydro-10-methylazepino [2,3-b]indol-5a(2H)-ol (5.00 g., 0.0231 mole), 10% palladium-on-carbon catalyst (2.5 g.) and acetic anhydride (500 ml.) was hydrogenated at an initial pressure of 30 p.s.i. for 8 hours and allowed to stand under hydrogen without shaking for an additional 16 hours. The catalyst was removed by filtration through Celite diatomaceous earth; the solid was washed with ethyl acetate and the combined filtrate was concentrated in vacuo. The residue was dissolved in xylene and concentrated to remove last traces of acetic anhydride. This residue was chromatographed on silica gel (250 g.); 50 ml. fractions were collected. Fractions 1–13 were eluted with 30% ethyl acetate-70% cyclohexane and fractions 14–72 with ethyl acetate.

The first compound was eluted in fractions 5–7. A solution of this material in ethyl acetate was acidified with methanolic hydrogen chloride and the salt was crystallized from ethanol-ethyl acetate to give 1.12 g. of melting point 211–212°C. (dec.) and 0.344 g. of melting point 207.5–208.5° C. (23.9% yield) of 1-ethyl-1,2,3,4,5,10 - hexahydro - 10-methylazepino[2,3-b]indole hydrochloride. The analytical sample of melting point 209–210° C. (dec.) was prepared by recrystallizing this material from ethanol-ethyl acetate.

U.V.: $\lambda_{max}$ 219, 276 and 283 m$\mu$ ($\epsilon$ 17,700; 8550 and 8700 respectively) with an inflection at 293 m$\mu$ ($\epsilon$ 7650).

*Analysis.*—Calcd. for $C_{15}H_{21}ClN_2$ (percent): C, 68.03; H, 7.99; Cl, 13.39; N, 10.58. Found (percent): C, 67.73; H, 7.89; Cl, 13.46; N, 10.10.

A 0.5 g. sample of the hydrochloride was treated with sodium carbonate in water until the reaction mixture was basic. The mixture was then extracted with methylene chloride, the methylene chloride extacts evaporated to give the free base, 1 - ethyl - 1,2,3,4,5,10-hexahydro-10-methylazepino[2,3-b]-indole.

The second compound was eluted from the column in fractions 12–15 and was crystallized from ethyl acetate-Skellysolve B hexanes to give 1.42 g. (25.4%) of 1-acetyl-1,2,3,4,5,10-hexahydro-10-methylazepino[2,3-b]indole of melting point 130–132.5° C. The analytical sample of melting piint 125–125.5° C. was prepared by recrystallizing some of this material from ethanol Skellysolve B hexanes.

U.V.: $\lambda_{max}$ 226, 285 and 293 m$\mu$ ($\epsilon$ 40,000; 9290 and 8100 respectively) with an inflection at 279 ($\epsilon$ 8560).

*Analysis.*—Calcd. for $C_{15}H_{18}N_2O$ (percent): C, 74.35; H, 7.49; N, 11.56. Found (percent): C, 74.60; H, 7.54; N, 11.48.

Further elution of the column (fractions 35–63) gave two additional compounds which were poorly separated. This material was thus combined and rechromatographed on silica gel (150 g.) with 2% triethylamine-23% cyclohexane-75% ethyl acetate. The first compound eluted from this column was crystallized from ethyl acetate-Skellysolve B hexanes to give 0.408 g. (6.87%) of 3,4,5,10 - tetrahydro - 10 - methylazepino[2,3-b]indol-5a-(2H)-ol acetate ester of melting point 108.5–110° C. The analytical sample of melting point 105–108° C. was prepared by recrystallizing some of this material from ethyl acetate-Skellysolve B.

U.V.: $\lambda_{max}$ 217, 277 and 311 m$\mu$ ($\epsilon$ 23,430; 15,070 and 2450 respectively).

*Analysis.*—Calcd. for $C_{15}H_{18}N_2O_2$ (percent): C, 69.74; H, 7.02; N, 10.85. Found (percent): C, 69.61; H, 7.04; N, 10.36.

The second compound eluted from the column was crystallized from ethyl acetate-Skellysolve B hexanes after decolorization with activated charcoal to give 0.169 g. (2.81%) of 1 - acetyl - 2,3,4,5,10,10a - hexahydro-10-methylazepino[2,3-b]indol-5a(1H)-ol of melting point 139–141° C. The analytical sample of melting point 141.5–152.5° C. was prepared by recryrtallizing this material from ethyl acetate-Skellysolve B hexanes.

U.V.: $\lambda_{max}$ 250 and 306 m$\mu$ ($\epsilon$ 12,950 and 2625 respectively).

*Analysis.*—Calcd. for $C_{15}H_{20}N_2O_2$ (percent): C, 69.20; H, 7.74; N, 10.76. Found (pecent): C, 68.96; H, 7.89; N, 10.71.

I claim:
1. A compound of the formula

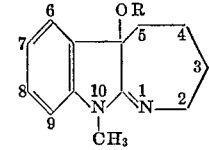

X wherein R is selected from the group consisting of hydrogen and acetyl and the pharmacologically acceptable acid addition salts thereof.

2. The compound of claim 1 wherein R is H and which is therefore 3,4,5,10-tetrahydro-10-methylazepino-[2,3-b]indol-5a(2H)-ol.

3. The compound of claim 1 wherein R is acetyl and which is therefore 3,4,5,10-tetrahydro-10-methylazepino-[2,3-b]indol-5a(2H)-ol acetate ester.

References Cited

UNITED STATES PATENTS 3,419,569  12/1968  Renner.

ALEX MAZEL, Primary Examiner

J. A. NARCAVAGE, Assistant Examiner

U.S. Cl. X.R.

71—95; 260—326.5; 424—274